(12) United States Patent
Primak et al.

(10) Patent No.: US 6,598,077 B2
(45) Date of Patent: Jul. 22, 2003

(54) SYSTEM AND METHOD FOR DYNAMIC CONTENT ROUTING

(75) Inventors: Leonard Primak, New York, NY (US); Kailai Chen, Morganville, NJ (US); John Gnip, Rego Park, NY (US)

(73) Assignee: WARP Solutions, Inc., New York, NY (US)

( * ) Notice: Subject to any disclaimer, the term of this patent is extended or adjusted under 35 U.S.C. 154(b) by 0 days.

(21) Appl. No.: 09/730,259

(22) Filed: Dec. 5, 2000

(65) Prior Publication Data

US 2001/0039586 A1 Nov. 8, 2001

Related U.S. Application Data

(63) Continuation-in-part of application No. 09/565,259, filed on May 5, 2000, now Pat. No. 6,389,448.
(60) Provisional application No. 60/241,528, filed on Oct. 17, 2000, provisional application No. 60/202,329, filed on May 5, 2000, provisional application No. 60/201,801, filed on May 4, 2000, and provisional application No. 60/169,196, filed on Dec. 6, 1999.

(51) Int. Cl.$^7$ .............................................. G06F 13/00
(52) U.S. Cl. ...................... 709/219; 709/226; 709/228; 709/229
(58) Field of Search ................................ 709/203, 205, 709/206, 217, 219, 225, 228, 232, 238, 313, 329, 226, 229

(56) References Cited

U.S. PATENT DOCUMENTS

| | | |
|---|---|---|
| 4,748,558 A | 5/1988 | Hirosawa et al. |
| 5,459,837 A | 10/1995 | Caccavale |
| 5,559,764 A | 9/1996 | Chen et al. |
| 5,740,371 A | 4/1998 | Wallis |
| 5,774,660 A | 6/1998 | Brendel et al. |
| 5,774,668 A | 6/1998 | Choquier et al. |
| 5,828,847 A | 10/1998 | Gehr et al. |
| 5,864,535 A | 1/1999 | Basilico |
| 5,881,238 A | 3/1999 | Aman et al. |
| 5,890,156 A | 3/1999 | Rekieta et al. |
| 5,894,554 A | 4/1999 | Lowery et al. |
| 5,898,870 A | 4/1999 | Okuda et al. |
| 5,915,095 A | 6/1999 | Miskowiec |
| 5,933,596 A | 8/1999 | Mayhew |
| 5,933,606 A | 8/1999 | Mayhew |
| 5,951,694 A | 9/1999 | Choquier et al. |
| 5,991,808 A | 11/1999 | Broder et al. |
| 6,006,259 A | 12/1999 | Adelman et al. |
| 6,006,264 A | 12/1999 | Colby et al. |
| 6,014,660 A | 1/2000 | Lim et al. |
| 6,041,307 A | 3/2000 | Ahuja et al. |
| 6,070,191 A * | 5/2000 | Narendran et al. ......... 709/226 |
| 6,076,108 A * | 6/2000 | Courts et al. ................ 709/227 |
| 6,098,093 A * | 8/2000 | Bayeh et al. ................ 709/203 |
| 6,173,322 B1 * | 1/2001 | Hu ............................... 709/224 |
| 6,263,368 B1 * | 7/2001 | Martin ......................... 709/224 |
| 6,405,252 B1 * | 6/2002 | Gupta et al. ................ 709/224 |

* cited by examiner

*Primary Examiner*—Viet D. Vu
(74) *Attorney, Agent, or Firm*—Fulbright & Jaworski LLP

(57) ABSTRACT

A system for directing a request for dynamic content to an application server which having access to a database containing updated data relevant to the request. The system contains a dynamic content router, database replication agents and web server plug-ins. The dynamic content router directs the web server plug-ins to forward the request to the appropriate application server.

14 Claims, 5 Drawing Sheets

SYSTEM AND METHOD FOR DYNAMIC CONTENT ROUTING

RELATED APPLICATION

This application is a continuation-in-part of U.S. provisional patent application Ser. No. 60/241,528, filed Oct. 17, 2000; a continuation-in-part of patent application Ser. No. 09/565,259, filed May 5, 2000, now U.S. Pat. No. 6,389,448, which is a continuation-in-part of U.S. provisional patent application Ser. No. 60/169,196, filed Dec. 6, 1999; a continuation-in-part of U.S. provisional patent application Ser. No. 60/201,801, filed May 4, 2000; and a continuation-in-part of U.S. provisional patent application Serial No. 60/202,329, filed May 5, 2000. Each of these applications are hereby incorporated by reference in their entirety.

FIELD OF THE INVENTION

The present invention generally relates to the field of website infrastructure development. Specifically, the present invention relates to a system and method for scaling website databases and directing requests for dynamic content.

BACKGROUND OF THE INVENTION

Many of today's commercial websites utilize a three layer architecture consisting of: (1) a web server layer, (2) an application server layer, and (3) a database layer. The web server layer typically has one or more web server clusters, each web server cluster having a plurality of web servers. In the three layer architecture, the web servers generally store stagnant data or content, such as HTML scripts and Java code, which is transmitted to a client's computer in response to the client's request for such stagnant content. However, when a client requests dynamic content that must be generated in real-time, the web-server issues a request to an application server within the site's application server layer for such dynamic content.

The application server layer comprises one or more application server clusters, each cluster having one or more applications servers. The application servers provide dynamic content based on information relating to or received from a specific client. That is, the application server can provide the dynamic content based on either a client's specific request, i.e., information inputted onto an input screen by the client, or the client information previously stored in a database in the site's database layer. The client information stored in the database layer can include client's personal or financial information provided by the client during his/her prior visit to the web site, information regarding the client's past activity on the website, or information relating to transactions consummated by the client on the site. For example, the database layer of a web site operated by a bank or financial institution can store information regarding the activity within and status of accounts maintained by a client of the bank.

Web servers, application servers, and databases typically communicate with one another using standard communication protocols, such as TCP/IP. However, some application server vendors have adopted proprietary communications protocols for their application servers, thereby posing potential interoperability problems in connecting to other vendors' web servers and databases.

As web site traffic grows, the site's infrastructure must be easily scalable to accommodate the increasing load on the servers and databases. For example, a system for scaling server clusters is delineated in applicant's U.S. patent applications Ser. No. 09/565,259, now U.S. Pat. No. 6,389,448 and U.S. Provisional Patent Applications No. 60/169,196, No. 60/201,810 and No. 60/202,329, each of which are herein incorporated by reference in their entirety. It is appreciated that scaling of an application server is vendor dependent and some application servers may rot scalable. However, databases are not currently easily scalable and the web site owner has limited options when the database is overloaded. When the web site database server has reached its limits in accepting and processing the number simultaneous connections, the web site owner currently has two options available for increasing the capacity of the database server. The first option is to replace the existing database or database system with a higher capacity database or database system and the second option is to add another database and appropriately modify the application servers (i.e., applications running on the application servers) to recognize the new database. However, both of these options are costly and complicated propositions for web site owners and/or operators. Additionally, the second option requires communized code for the application servers. Further, it is appreciated that these two options offer only short term solutions to the problem and the web site owners and/or operators may potentially face this problem along with its associated cost to correct the problem when the database again reaches its capacity limit.

Typically, Internet related applications use a client/server model, wherein a client sends its request to the server via the Internet or other comparable communications or computer network. The server processes the request, often involving accessing and changing the dynamic content related to the client, and sends the results back to the client. The server's ability to identify the dynamic content involved in the client requests is crucial to the performance of many Internet applications. This identification is not trivial since in many cases the client request contains incomplete or no information about the dynamic content. Only the server or content source has the whole knowledge about the content involved. Accordingly, the present invention provides a system and method for identifying the dynamic content involved in every client request requiring access to the dynamic content.

OBJECT AND SUMMARY OF THE INVENTION

Therefore, it is an object of the present invention to provide a system and method that overcomes the shortcomings of the prior art system.

Another object of the present invention is to provide a system and method which scales web site databases.

A further object of the present invention is to provide a system and method which directs a client's request for dynamic content or data to an application server connected to a database having the most current version of such data.

Still another object of the present invention is to provide a system and method as aforesaid, which balances load among the application servers.

In accordance with one embodiment, the present invention comprises a dynamic content router, database replication agents, and plug-ins integrated into the web servers. The web server plug-ins intercept and direct a client's request for dynamic content to the dynamic content router. The dynamic content router then determines the appropriate application server or application cluster for the client's request based on number of factors, including but not limited to the content availability, data server's capacity and session persistence. The dynamic content router transmits or forwards the identity of the selected application server to the web server plug-in, which causes the client's request to be forwarded or routed to the selected application server. However, if a session already exists between the client and one of the application servers, the dynamic content router routes all requests to such application server.

Once the web server plug-in receives the identity of the selected application server, the web server plug-in causes its associated web server to establish a connection with the selected application server. Upon establishing a connection with the web server, the selected application server initiates a session by generating and transmitting a cookie or other comparable session identifier to the web server. The web server forwards the cookie or session identifier to the client's computer for storage.

When a session is established between the client and the selected application server, the dynamic content router examines the session communications to determine or extract a client identifier (also referred to herein as a content identifier). The dynamic content router utilizes the content identifier to determine if the client is already logged onto one of the application servers on the site. If the dynamic content router determines that the client had previously logged onto one of the application servers on the web site, the dynamic content router verifies whether client's previous login information is available to the selected application server. If the client's current application server does not have access to the client's login information, then the dynamic content router directs the web server plug-in to establish a connection with an application server that has access to the client's login information.

In accordance with an embodiment of the present invention, the system additionally includes an application server proxy that acts as an interface between the web servers and application servers utilizing proprietary communications protocols.

In accordance with another embodiment of the present invention, the dynamic content router is scalable. For example, when the web site operator and/or owner adds another dynamic content router when the capacity of the existing dynamic router is exceeded, the web server plug-ins of the present invention automatically selects a least loaded dynamic content router for routing the client's requests.

Various other objects, advantages, and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE INVENTION

The present invention is readily implemented using presently available communication and computing apparatuses and electronic components. The invention finds ready application in private or public communications networks, including but not limited to the Internet, a computer network, a wireless network, a satellite network, a cable network or any other form of network capable of transporting data locally or globally.

Figure 1:
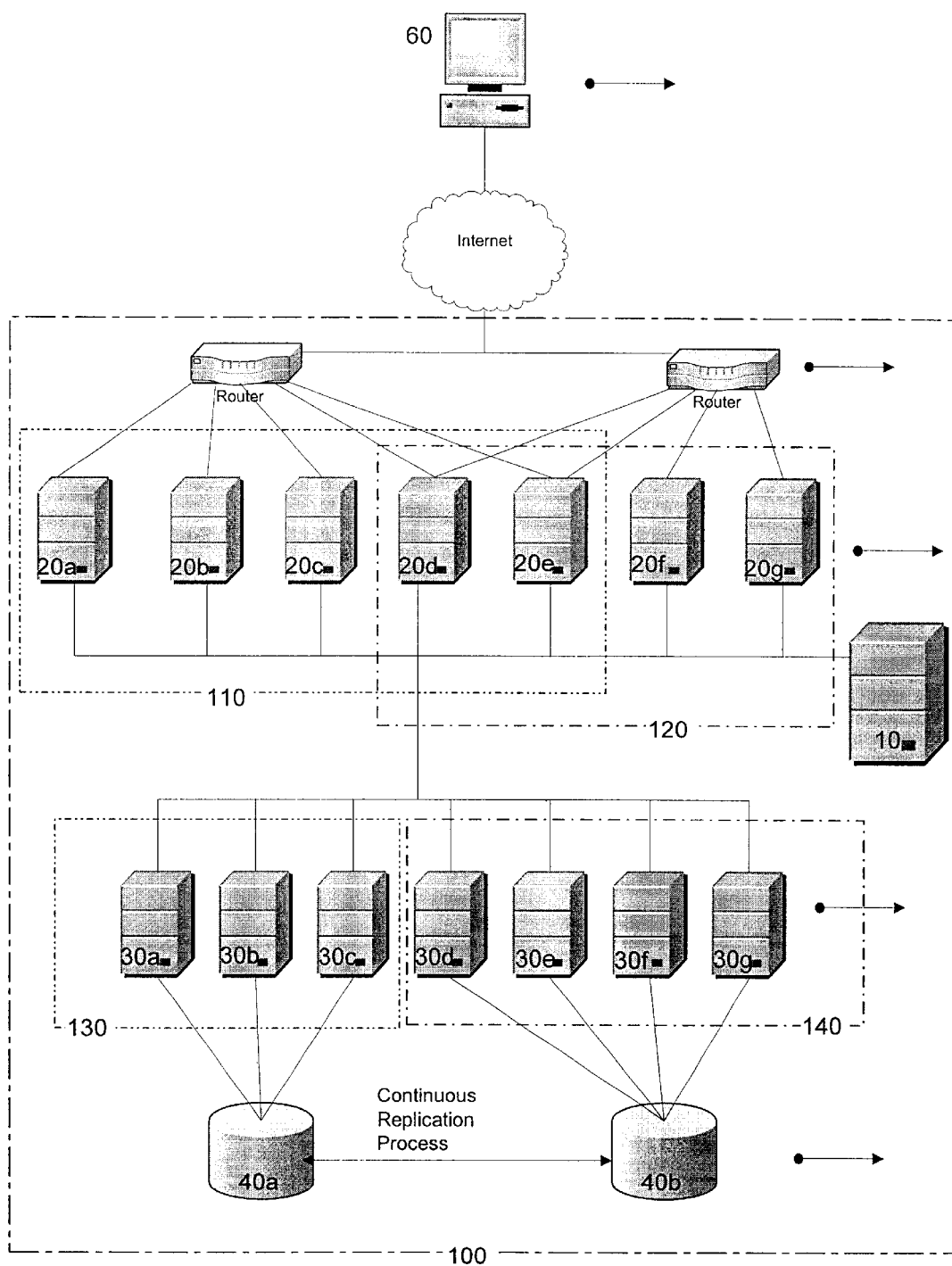
FIG. 1 is a diagram of a web site employing a three layer architecture and a dynamic content router in accordance with an embodiment of the present invention.

Turning now to FIG. 1, there is illustrated an example of a web site 100 having a three layer architecture and a dynamic content router 10 in accordance with an embodiment of the present invention. The web site 100 has two overlapping web server clusters 110 and 120. The web server cluster 110 comprises web servers 20$a$ to 20$e$ and the second web server cluster comprising web servers 20$d$ to 20$g$. Additionally, there are two application server clusters 130 and 140. The application server cluster 130 comprises application servers 30$a$ to 30$c$ and the application server cluster 140 comprises servers 30$d$ to 30$g$. The application server clusters 130 and 140 are respectively connected to a separate mirrored database 40$a$ and 40$b$. The databases 40$a$ and 40$b$ continuously replicate data tables from one to another, thereby synchronizing and maintaining a mirrored configuration.

In accordance with an embodiment of the present invention, the dynamic content are divided, classified or categorized into two classes of content: segmentable and non-segmentable content. Content is considered or classified as segmentable content if the content can be divided into small segments, each segment being self-contained and preferably represented by a content label. Operations or operational tasks can be associated with a particular content label, wherein such associated operations are performed only on or affect only the content segments corresponding to the content label. That is, the dynamic content of the client can be represented by a content label. Preferably, the content label can be used in one of the client requests to obtain the authentication to determine if the client has previously accessed the web site or the application server. For example, the system can authenticate or determine if the client had previously accessed the web site or the application server during the login or sign in process before the client can initiate any transaction or request for content.

Whereas, content is considered or classified as non-segmentable content if the content cannot be represented by a content label or shared by one or more segments of the segmentable content. The segmentable dynamic content can be mirrored because different people can access different segments of the segmentable content at the same time while maintaining data integrity.

In accordance with an aspect of the present invention, the mirrored content can be active at the same time while maintaining its transactional integrity. For example, in a trading application, content such as the cash balance, transactions, holdings of an account can be labeled as an account, and operations or operational tasks, such as trading, depositing and withdrawing affect only content segments labeled or represented by the content label "account". In the trading application example, the segmentable content can represent cash balances, transactions, account holdings, personal information, etc., and non-segmentable content can represent data shared by all account, such as margin rate, stock quotes, bond prices, and the like. content.

In accordance with an embodiment of the present invention, the content can be segmented or divided in number of different ways to maximize the number of mirrored content or data. That is, the present invention segments the content to maximize the number of the segmentable content, thereby effectively increasing the level or degree of mirroring for such content. Accordingly, the content stored in database 40*a* and 40*b* is segmentable and are represented by their content label.

In an auction site example, the segmentable content can represent either account related content or bid items. It is appreciated that if the content is segmented in one manner, i.e., based on account related content, then the system will categorize the bid items as non-segmentable content. Accordingly, the system cannot mirror all potentially "segmentable" content, i.e., the system can mirror account related content or bid items, but not both. However, it is appreciated that for a typical auction site, the number of bid item related content will far exceed the number of account related content. Also, the bid item related content is more likely susceptible to dynamical changes. Accordingly, in the auction example, the system should segment the web site data or content based on bid item rather than account data, thereby mirroring the bid item related content. The account related content can be stored in a shared database or mirrored if the system does not permit the account related content to be dynamically changed after client signs in, i.e., establishes a session.

In accordance with an aspect of the present invention, the segmentable content can be grouped into content groups, each content label belonging to one or more content group. Accordingly, operations to be performed on a group of segmentable content can be represented by content group label. The non-segmentable content can be stored in a shared database, thereby advantageously permitting the system of the present invention to provide a combination of distributed and mirrored solutions to accommodate the needs of the current and future Internet related applications.

Typically, most Internet related applications use a client/server model, wherein a client sends its request to the server via the Internet or other comparable communications or computer network. The server processes the request, often involving accessing and changing the dynamic content related to the client, and sends the results back to the client. The server's ability to identify the dynamic content involved in the client requests is crucial to the performance of many Internet applications. This identification is not trivial since in many cases the client request contains incomplete or no information about the dynamic content. Only the server or content source has the whole knowledge about content involved. Accordingly, the present invention provides a system and method for identifying the dynamic content involved in every client request requiring access to the dynamic content.

According to an embodiment of the present invention, the system and method examines the request to identify or determine the dynamic content that needs to be accessed by the request. That is, the system intercepts and examines every client request and the examination can occur before the requests reach one of the application servers 30*a* to 30*g* or within one of the web servers 20*a* to 20*g*. By building a dynamic picture of the sessions and content, the present system is able to identify the content label involved in all client requests requiring access to the dynamic content. This advantageously enables the system to know the dynamic content required for each request before such request is routed to the appropriate application server and the database. In other words, the client request can be identified by its content label before the request is routed to the appropriate database 40*a* or 40*b*.

Figure 4:
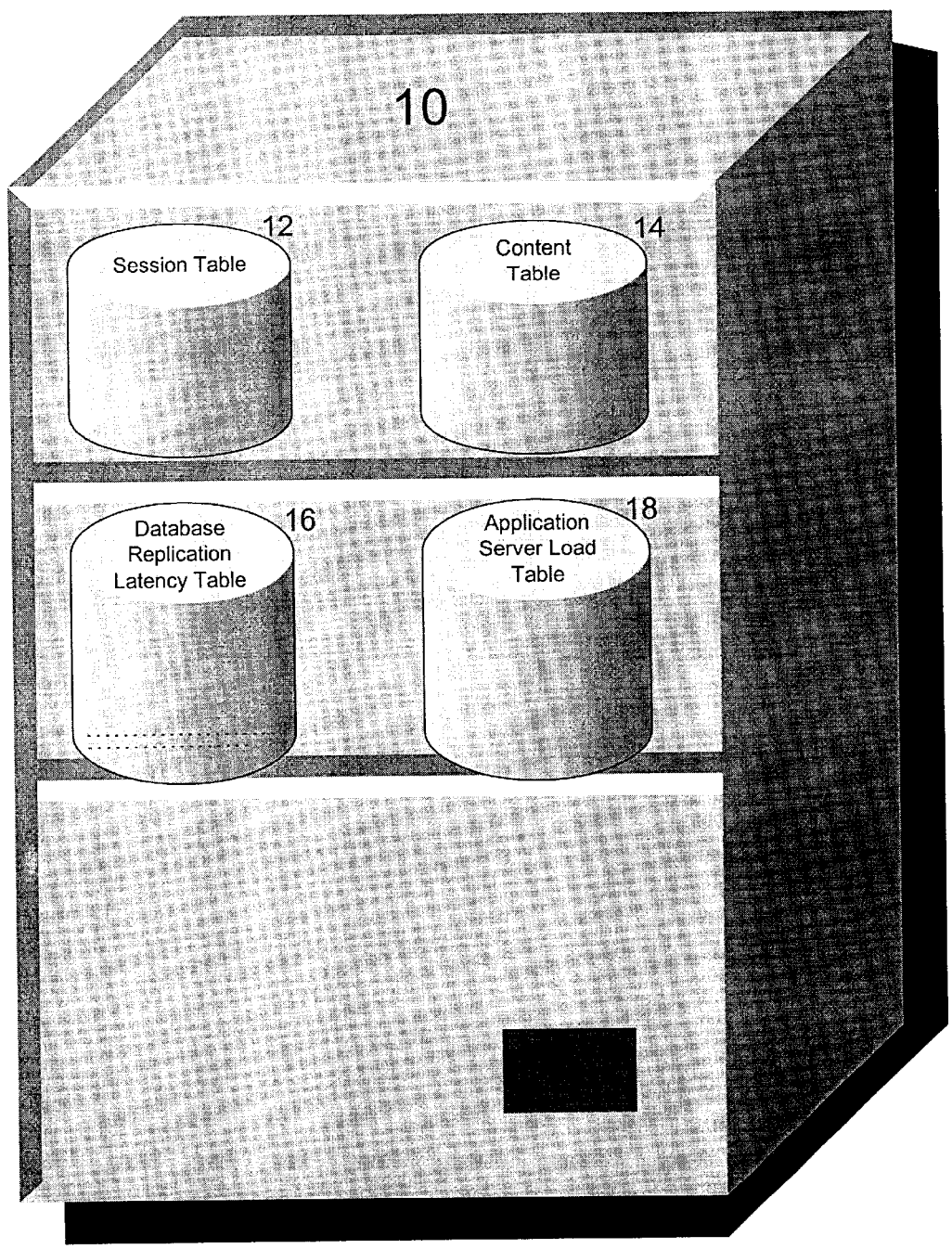
FIG. 4 is a diagram showing an example of data tables maintained within the dynamic content router in accordance with an embodiment of the present invention.

After a client 60 accesses one of the application servers 30*a* to 30*g* for the first time, that application server assigns and maintains a session ID for the client 60. Thereafter, every client request from the client 60 includes the session ID and the application server uses the session ID to identify the client 60. Preferably, the dynamic content router saves the session ID in the session table 12 (FIG. 4). During the session, at least one of the client request includes the content label for authentication to verify that the client (or user) has access rights or privileges to the requested content. The web server extracts the content label and forwards the extracted content label to the dynamic content router 10 which stores the extracted content label in the content table 14 (FIG. 4). Preferably, the dynamic content router 10 (FIG. 1) establishes or builds a link between the session ID and the content label. It is appreciated that the subsequent client requests may or may not include the content label. However, since the client request includes session ID, the dynamic router 10 can extract the session ID from the client request. The extracted session ID then can be used by the dynamic router 10 to search the session table 12 to find corresponding content label. That is, once the session ID is found in the session table 12, the dynamic content router can use the link to locate the content label associated with this client and thereafter determine the dynamic content based on the content label.

In accordance with an embodiment of the present invention, the dynamic content router 10 uses the information extracted and/or derived from the request to route the request to the appropriate application server. For example, if the content is partitioned, by determining or knowing the dynamic content involved in the request, the dynamic content router 10 can route the request to the right source of the content, i.e., the appropriate application server. If the content source is mirrored, i.e., mirrored database, by determining or knowing the dynamic content involved in the client request, the dynamic content router 10 can identify which source of the content (or the database) has the most recent version of the content as described herein. Thus, the dynamic content router 10 of the present invention can always route the client requests to the right content source (the appropriate database). It is appreciated that the dynamic content router 10 of the present invention can be used in many Internet related applications to dynamically route the client requests based on the content associated with such requests.

Returning to FIG. 1, the client 60 sends a request for content to one of the web servers 20*a* to 20*g*, referred to hereinafter as the receiving web server 20. When the client 60 requests stagnant content, the receiving web server 20 provides the client 60 with the requested stagnant content. However, if the client 60 requests dynamic content, a plug-in 22 (FIG. 2), which is integrated into each web server, routes or directs the request from the client 60 to the dynamic content router 10. The dynamic content router 10 evaluates the request and selects an application server 30 based on its evaluation of the request. Also, the dynamic content router 10 sends an instruction to the plug-in 22 of the web server 30 to direct all request from the client 60 to the selected application server 30.

Figure 2:
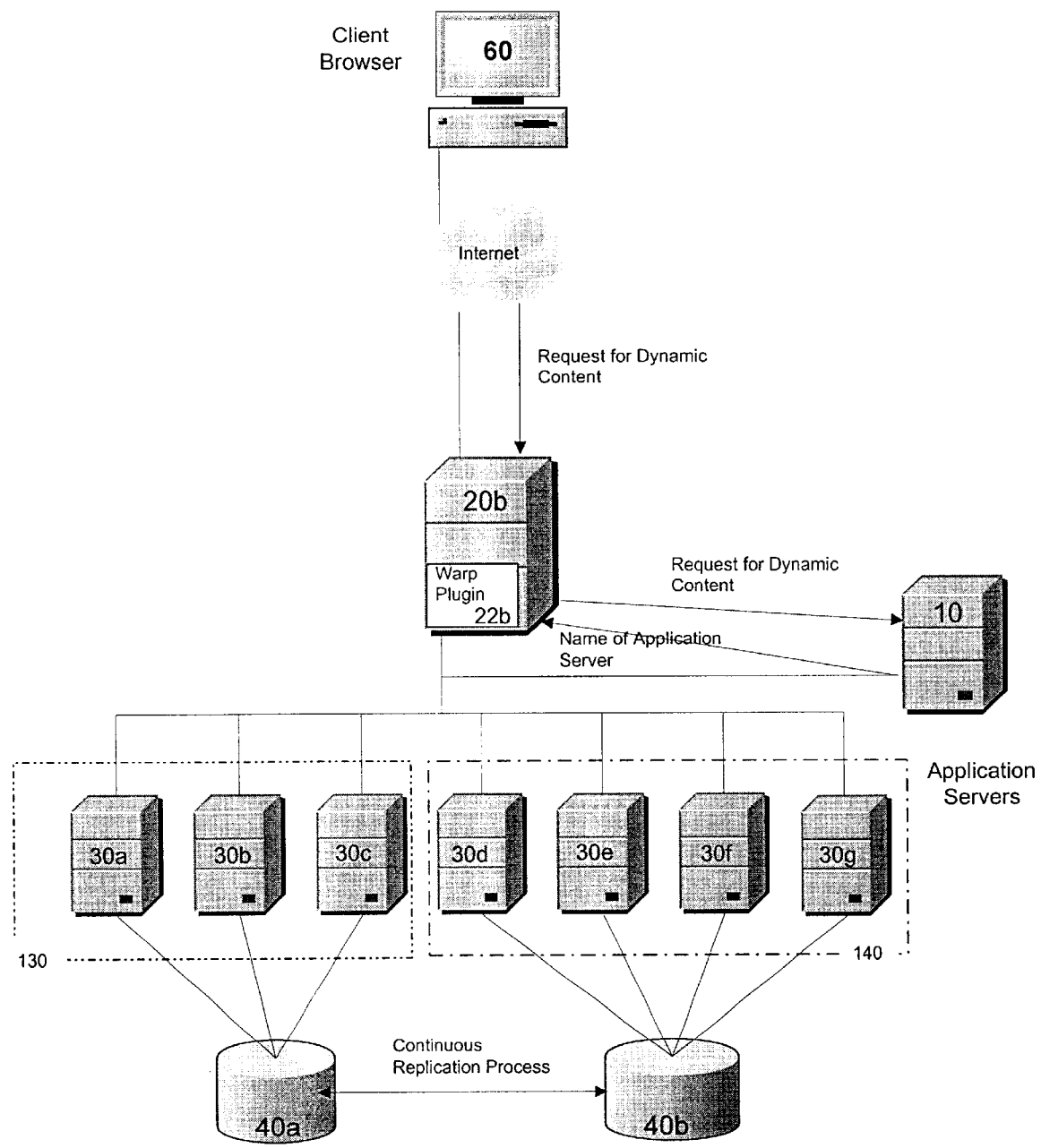
FIG. 2 is a diagram showing communications flow between a web server plug-in and the dynamic content router in accordance with an embodiment of the present invention.

Turning now to FIG. 2, there is illustrated an example of the plug-in 22 of the web server 30 transmitting the request for dynamic content from the client 60 to the dynamic content router 10 and then to an application server 30 selected by the dynamic content router 10. Based on its review or evaluation of the request, the dynamic content router 10 selects an appropriate application server 30 that is best suited to provide the requested content or data to the client 60. For example, in FIG. 2, the dynamic content router 10 selects the application server 30c based on its evaluation of the request, and informs the plug-in 22b of the web server 20b to direct or route all requests from the client 60 to the application server 30c. As shown in FIG. 2, the application server 30c is connected to the database 40a and is part of the application server cluster 130.

Figure 3:
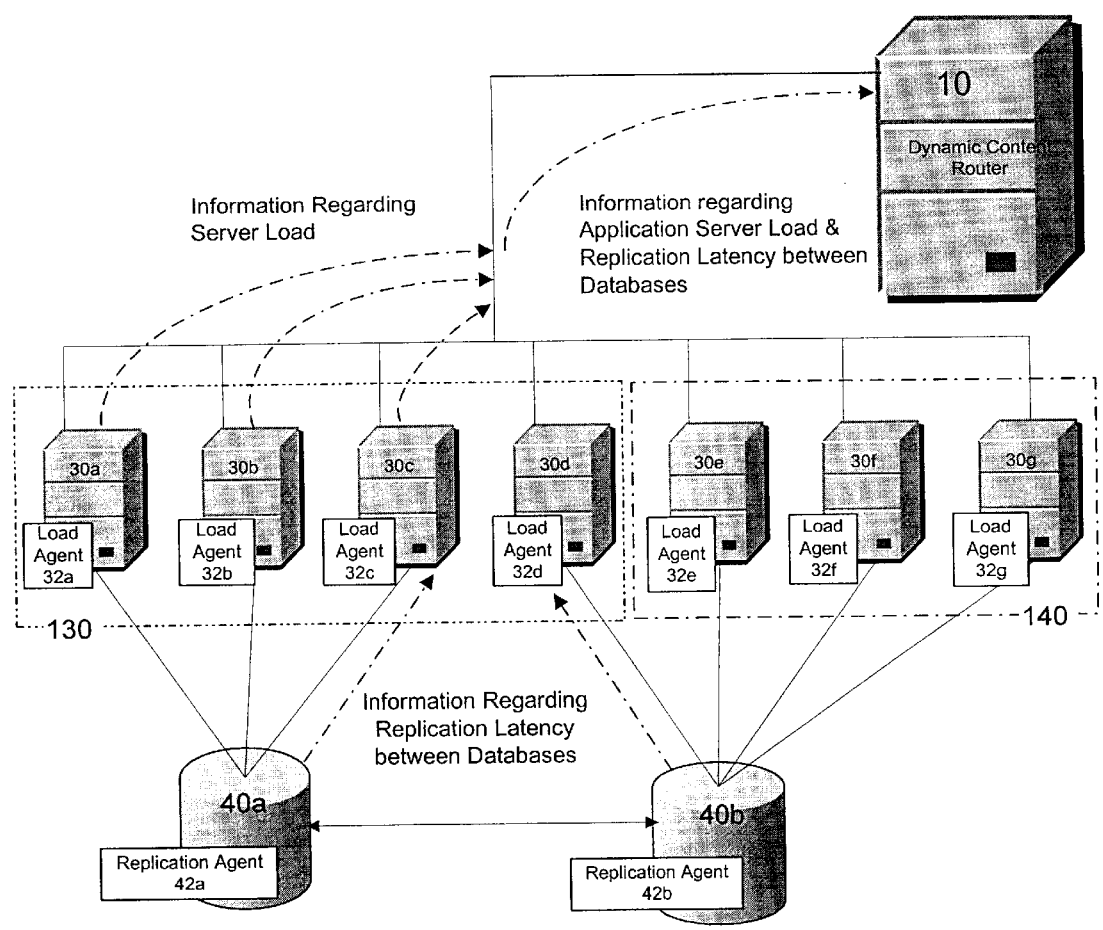
FIG. 3 is a diagram showing communications flow between database replication agents, application server load balancing agents and the dynamic content router in accordance with an embodiment of the present invention.

Turning now to FIG. 3, there is illustrated an embodiment of the application server 32 which includes a load agent 32. That is, the application server 30a–30g respectively includes load agents 32a–32g. Each load agent 32 monitors various performance parameters of its respective application server 30, including but not limited to CPU load, disk usage, and other factors which can affect the application server's ability to receive and process requests. Additionally, each load agent 32 intermittently transmits information regarding its respective application server's ability to accept requests or connections (i.e., available capacity of the application server) to the dynamic content router 10. The dynamic content router 10 stores the available capacity information, such as in an application server load table 18 of FIG. 4.

In accordance with an embodiment of the present invention, the databases 40a and 40b respectively includes replication agents 42a and 42b for monitoring two-way replication between the databases 40a and 40b. Alternatively, the replication agents 42 can reside in a separate host or server to monitor any number of databases. For example, the replication agents 42 send and receive timestamp messages to and from each other. The replication agents 42 can determine the real time replication latency between databases 40 by comparing the sent and received timestamps. That is, the replication agents 42 can determine how long it takes to update data from one database 42 to another database 42 by comparing the sent and received timestamps. Each replication agent 42 reports or transmits its respective latency information to the dynamic content router 10. Preferably, the dynamic content router 10 stores the latency information for each database 40, such as in the database replication latency table 16 of FIG. 4. According to an aspect of the present invention, the replication agents 42 can also detect and report database 40 failures to the dynamic content router 10. This enables the dynamic content router 10 to isolate the disabled or failed database. For example, if the database 40a is disabled, then the dynamic content router 10 can instruct the plug-ins 22 to route all requests for content to the application server cluster 140 which is connected to the database 40b. That is, the requests are no longer routed to the application server cluster 130 that is connected to the disabled database 40a.

In accordance with an embodiment of the present invention, each replication agent 42 creates a special table in the host database 40, i.e., the database being monitored by the replication agent 42. Similar to the data tables utilized by the application server 30, the special table is also replicated between the databases 40. For example, when a replication agent periodically inserts or updates a record in the special table with a replication agent identifier and a current timestamp, such updates are replicated to other databases. Also, each replication agent 42 registers a procedure, such as activating an SQL statement in the database, to monitor any change in the special table. The replication agent 42 calculates and reports the latency to the dynamic content router 10 if there is any change or update to the special table. If there is a failure with the updates, the replication agent 42 retries the procedure to determine if the database 40 is disabled or out of service. If the retries and reconnections to the database 40 are unsuccessful, the replication agent 42 reports such failure to the dynamic content router 10.

Preferably, the replication agents 42 run in the same host computer as the database 40, thereby insuring that faulty alarms are generated only when database 40 is disabled and minimizing the possibility of the faulty alarms resulting from a network failure.

In accordance with an embodiment of the present invention, as shown in FIG. 4, the dynamic content router 10 maintains four data tables: a session table 12, a content table 14, a database replication latency table 16 and an application server load table 18. In accordance with an aspect of the present invention, each record in the session table 12 has at least three fields: a session ID, a content ID and a session server ID. When an application server 30 establishes a session with a client 60, the application server 30 generates and transmits a session identifier (or a session ID) to the client 60. For example, the session ID can be a cookie or some other unique code for identifying the client 60 by the application server 30. During the session, all subsequent requests from the client 60 generally include the session ID.

Using FIG. 2 as an example, when a request is received by the web server 20b from the client 60, the plug-in 22b of the web server 20b transmits the request to the dynamic content router 10. The dynamic content router 10 extracts or intercepts the session ID from the request, and stores the session ID and a session server identifier (or a session server ID) as a record in the session table 12. The session server ID identifies the application server 30c that established the current session with the client 60 and issued the session ID.

Each time a request for content is received from the client 60, the dynamic content router 10 examines the header of the request for a session ID. If the request contains a session ID, the dynamic content router 10 compares the session ID against the entries in the session table 12. If the session ID of the request matches a session ID in one of the session records stored in the session table 12, the dynamic content router 10 instructs the plug-in 22b to route the request to the application server associated with the session server ID in the matching session record. However, if no matching session record is found, the dynamic content router 10 selects an application server based on some criteria, such as available capacity, access to a database containing the requested data, randomly, etc.

In accordance with an embodiment of the present invention, the dynamic content router 10 selects an application server 30 based on load values stored in the application server load table 18. The dynamic content router 10 compares the load value of each application server 30 to determine which application server 30 has available capacity to process the request from the client 60. For example, the dynamic content router 10 selects an application server 30 having the lowest load, thereby directing or routing the request to the application server 30 having the highest available capacity. If the total capacity of each application server 30 varies, the dynamic content router 10 can select an application server 30 having the lowest load value relative to other application servers 30.

After a session is established between a client 60 and the selected application server 30, the user associated with the client 60 (collectively referred to herein as the client) client or user can provide his/her identity through a login or signing in process, e.g., entering a name and password onto a login screen. For example, the web site operator/owner can institute a login process to limit access to its web site to only authorized users. The content label, e.g., identification of user, client, gateway, ISP, etc., is identified in this process and the unique content id is assigned to the content label that identified the content segment. The request containing the content ID is also forwarded to router 10 by plug-in 22. The router 10 stores the Content ID along with the associated Session ID and Session Server ID in the Session Table 12.

During the login process, the plug-in 22 of the web server 20 identifies the content label of the request, i.e., the identity of the client. Each content label is uniquely associated with a content ID. The plug-in 22 forwards the request and the content ID to the dynamic content router 10 which stores the content ID along with the associated session ID and session server ID in the session table 12.

Each time a client 60 logs onto the web site, the plug-in 22 of the web server 20 sends the content ID of the client 60 to the dynamic content router 10. The dynamic content router 10 compares the content ID of the client 60 against the entries in the content table 14. If no matching content record is found in the content table 14 indicating that the client is a first time visitor of the web site, the dynamic content router 10 generates a new content record for the client 60 in the content table 14. The new content record contains at least the content ID of the client 60, the session server ID stored in the "last access server" field in FIG. 4, and the login time and date of the client stored in the "last access time" field in FIG. 4.

If the client 60 had previously logged onto the web site, then one of the content records in the content table 14 will contain the content ID of the client 60. Accordingly, on each subsequent visit to the web site by the client 60, the dynamic content router 10 locates the content record of the client 60 from the content table 14. The content record of the client 60 includes the time and date of the client's last login or session and the identification of the application server 30 accessed by the client 60 in the last login (or the last accessed application server). If the client's current session server is same as the last accessed application server, the dynamic content router 10 updates the "last access time" field of the client's content record with the client's current session or login time and date.

However, if the client's current session server is different from the last accessed application server, the dynamic content router 10 determines whether the client's requests can be processed by the current session server or routed to another application server 30. The dynamic content router 10 reads the database replication latency table 16 to compare the replication latency values of the database connected to the client's current session server and the database connected to the last accessed application server. If the replication latency of the two databases 42a and 42b (the period of time it takes to copy updated records from one database to the other) is less than the time elapsed between the client's last access time and the client's current login time (i.e., a session interval), the dynamic content router 10 determines that the current session server can process the client's requests and appropriately updates the last accessed application server field and the last access time field of the client's content record. That is, the last accessed application server field now identifies the current session server and the last access time now reflects the client's current login time and date. It is appreciated that if the client's current session server and the last accessed server are connected to the same database 40, then the replication latency value will be zero and the dynamic content router 10 maintains the selection of the current session server and appropriately updates the last accessed application server field and the last access time field of the client's content record.

If the replication latency of the two databases 42a and 42b is greater than the time elapsed between the client's last access time and client's current login time, the dynamic content router 10 terminates the session with the client's current session server and establishes a new session with the last accessed application server, thereby creating a new session server for the client 60. That is, the dynamic content router 10 instructs the plug-in 22 to route the client's requests to the new session server (the last accessed application server) instead of the current session server. In accordance with an embodiment of the present invention, the dynamic content router 10 establishes the new session with the last accessed application server by sending the original request (which was saved when a session was first established with the current session server) to the last accessed application server and capturing the set session response, i.e., a response, such as a html page, from the last accessed application server. The dynamic content router 10 sends the set session response to the plug-in 22, which forwards it to the client 60. Thereafter, the client 60 includes the new session ID in its requests. Once the plug-in 22 facilitates the establishment of a new session between the client 60 and the new session server 30 (the last accessed application server), the dynamic content router 10 updates the last access time field of the client's content record to reflect the client's current login time and date. The dynamic content router 10 also updates the session table 12 to identify the client's new session server and to indicate the session ID issued by the new session server 30 for the client 60.

The database replication latency table 16 contains records indicating the replication latency between any pair of databases 40 on the web site. The replication agents 42 residing in each database 40 updates the database replication latency table 16.

Figure 5:
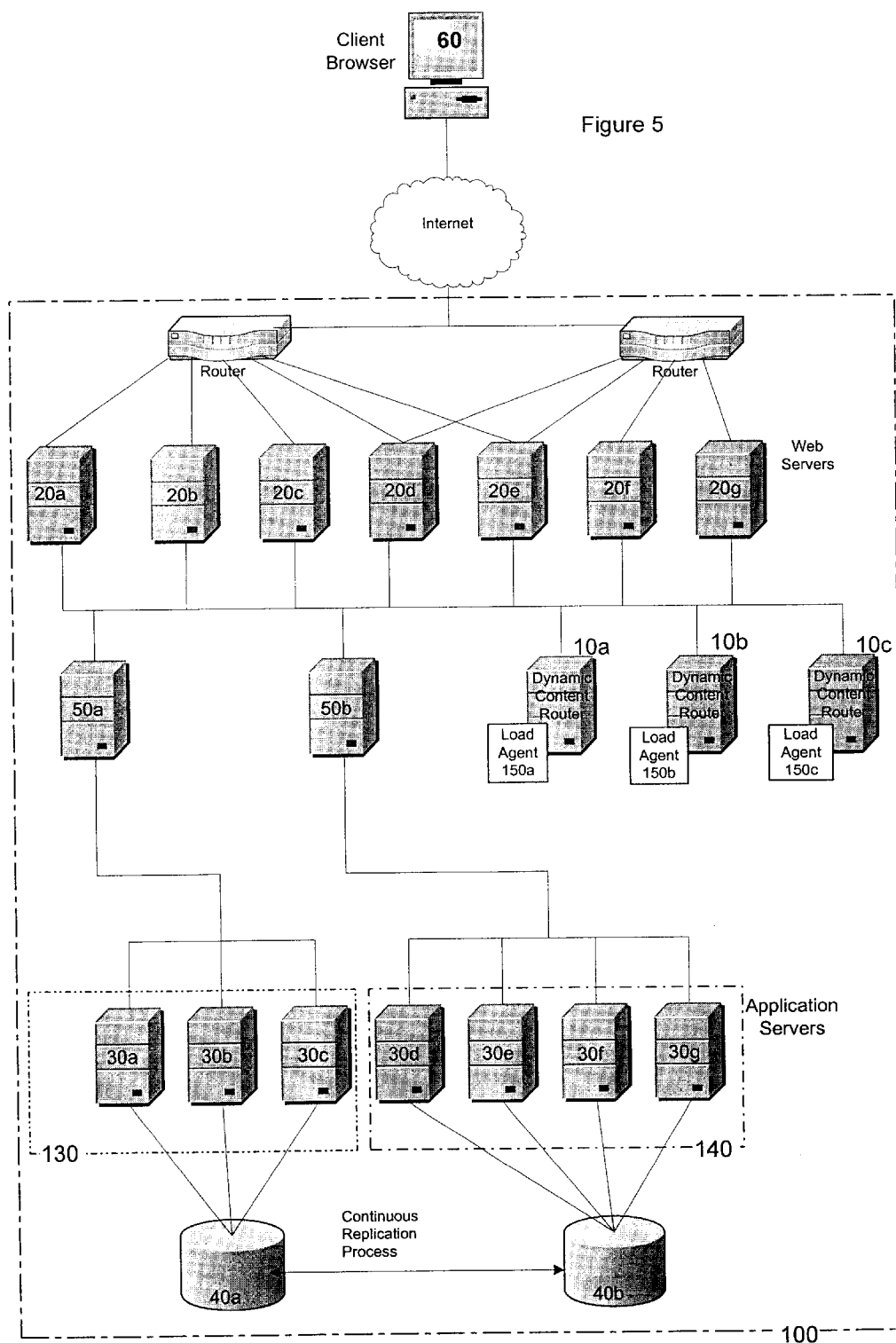
FIG. 5 is a diagram of a website employing a three layer architecture, multiple dynamic content routers and application server proxies in accordance with an embodiment of the present invention.

Turning now to FIG. 5, there is illustrated an example of a website 100 employing multiple dynamic content routers 10 and application server proxies 50a and 50b to handle proprietary protocol of the application servers 30 in accordance with the present invention. When a client 60 transmits a request for dynamic content, such as a request for a web page showing the client's account information stored on the site's databases 40, the request is first received by one of the web servers 20a–20g. For example, if the client's request is received by the web server 20e, then the plug-in 22e of the web server 20e transmits the request to one of the dynamic content routers 10a to 10c. Preferably, the plug-in 22e selects the dynamic content router 10 based on load information transmitted by load agents 150a to 150c residing and running on the dynamic content routers 10a to 10c, respectively. That is, the plug-in 22e selects the dynamic content router 10 with the lowest load. For example, the plug-in 22 can select the dynamic content router 10c as having the lowest load. It is appreciated that the tables 12, 14, 16 and 18 residing in each of the dynamic content routers 10a to 10c are continuously replicated, thereby maintaining the mirrored state of the dynamic content routers 10a to 10c.

The selected dynamic content router 10c examines the request from the client 60 for a session ID. Since a first request from a client who has not yet established a session with one of the application servers 30 does not include a session ID, the selected dynamic router 10c selects an application server based on load values of the application servers 30 stored in the application server load table 18 (FIG. 4). For example, the dynamic content router 10c can select the application server 30a belonging to the application server cluster 130 as having the lower load value. In such case, the dynamic content router 10c instructs the plug-in 22e to route the client's request to the application server cluster 130 via the application server proxy 50a. The plug-in 22e sends the client's request to the application proxy 50a using standard TCP/IP protocols. The proxy 50a converts the request to conform to the proprietary protocol utilized by the application servers 30a to 30c belonging to the application cluster 130 and forwards the request to the selected application server 30a. In response to the request, the application server 30a establishes a session with the client 60 and sends back a session ID to the client 60. Before the session ID reaches the client 60, the plug-in 22e intercepts the session ID and sends a copy of the session ID to the dynamic router 10c. The dynamic router 10c generates a session record in its session table to record or store the session ID and the session server ID.

Subsequent requests from the client 60 may necessarily not be received by the web server 20e. For example, if the web server 20b receives the second request bearing the session ID issued by the application server 30a from the client, the plug-in 22b sends the request to the dynamic content router 10a (currently the least loaded dynamic content router). Since all of the dynamic content routers 10 are mirrored, the session record previously generated by the dynamic content router 10c is available from any dynamic content router's session table. That is the session table residing in the dynamic content router 10a contains all of the session records generated by the dynamic content routers 10a to 10c. The dynamic content router 10a compares the session ID in the client's request against the entries in its session Table 12. If a matching session record is found the dynamic content router 10a instructs the plug-in 22b to route the request to the application server 30 corresponding to the session server ID of the matching session record namely the application server 30a in this case.

Once the client 60 logs onto the web site, and a content ID, such as a user id, is issued to the client, the dynamic content router 10a checks its content table 14 to determine if the client 60 is a return visitor or a first time visitor. If it is determined that the client 60 is a return visitor (i.e., a matching content record exists), then the dynamic content router 10a obtains the last accessed server information from the matching content record. However, if it is determined that the client 60 is a first time visitor (i.e., no matching content record exists), then the dynamic content router 10a inserts a new content record for the client 60 into the content table 14. It is appreciated that the dynamic content router 10a does not direct the plug-in 22b to make any change with respect to the client's session with the application server 30a since this new client 60 is not being transferred to any last accessed application server.

In accordance with an embodiment of the present invention, the application server 30 stores information relating to the client's activity on the web site (e.g., stock or money transfer information) in the database 40. Preferably, either during or shortly after the client's visit to the web site, the activity data stored in one database 40 is replicated to other database 40, e.g., activity data stored in the database 40a is replicated to the database 40b. It is appreciated that the activity data of the client 60 may not have been replicated to all of the databases 40 by the time the client 60 re-logs onto the web site again. The replication of the activity data depends on the replication latency between the databases 40 and the time elapsed between the client's logins.

When a client 60 is a return visitor to the web site, a content record containing the unique content ID of the client exists in each content table 14 of the dynamic content routers 10. When a returning visitor (the client 60) initiates the login process, the plug-in 22 of the web server 20 extracts the content ID corresponding to a content label from the login request. For example, the content label can be a field name assigned by an application. For example, the content label can represent an account number for a trading application and a login id for an e-commerce site application. In accordance with an embodiment of the present invention, the content label has an associated value that is assigned during the login process. For example, an account number "XF456" is associated with the account number label and login name "kchen" can be associated with the login id label. Once the content ID is extracted from the request, the dynamic content router 10 searches the mirrored content table 14 for a content record matching or containing the content ID of the client. If a matching content record is found, the dynamic content router 10 compares the client's current session server to the last accessed server information in the matching content record. For example, if the client's current session server is the application server 30f and the last accessed server is the application server 30a (i.e., there is a mismatch of session servers), the dynamic content router 10 accesses its database replication latency table 16 to compare the latency between the databases 40 to the time elapsed between the client's last access time and the client's current login time. If the latency is less than the elapsed time between client's logins, the dynamic content router 10 updates the last access time and the last accessed server fields of the client's content record to reflect the client's current session server and current login time. However, if the latency is greater than the elapsed time between the client's logins, the dynamic content router 10 directs the plug-in 22 which sent the content ID to the dynamic content router 10 to facilitate a new session between the client 60 and the last accessed server. Once the new session is established, the dynamic content router 10 updates the last access time field in the content record of the client to reflect the client's new login time.

In accordance with an embodiment of the present invention, the content can be updated on database server 40a or 40b directly (bypassing the web servers 20 and the application servers 30). In such case, the updated content information must be forwarded to the dynamic content routers 10 so they can appropriately update their content tables and correctly route the requests to the appropriate database 40. The updates are identified by content labels or group content label. Preferably, a utility process (not shown) is used directly update the database 40 and to communicate with the dynamic content router 10.

While the present invention has been particularly described with respect to the illustrated embodiment, it will be appreciated that various alterations, modifications and adaptations may be made based on the present disclosure, and are intended to be within the scope of the present invention. It is appreciated that each server and/or database can be replicated for redundancy and robustness. It is intended that the appended claims be interpreted as including the embodiment discussed above, the various alternatives that have been described, and all equivalents thereto.

What is claimed:

1. A method of dynamic content routing a client request to an application server, comprising the steps of:

receiving a plurality of requests for dynamic content from a client associated with a session over a communications network, wherein at least one of said requests includes a content label;

determining whether a request received from said client includes said content label;

associating said content label with said session and said client if it is determined that said request received from said client includes said content label;

selecting an application server group from a plurality of application servers in accordance with said content label associated with said session;

routing all requests received from said client to said selected application server group;

determining a session ID and a session time of said session;

associating said content label associated with said session to said session ID to provide a link; and storing said link, said session ID and said session time as a last session time.

2. The method of claim 1, wherein the step of selecting includes the step of selection an application server group based on session persistence.

3. The method of claim 1, further comprising the steps of:

reading said session ID from said request to determine said link if it is determined that said request received from said client does not include said content label; and determining said content label as a function of said link.

4. A method of dynamic content routing a client request to an application server, comprising the steps of:

receiving a plurality of requests for dynamic content from a client associated with a session over a communications network, wherein at least one of said requests includes a content label;

determining whether a request received from said client includes said content label;

associating said content label with said session and said client if it is determined that said request received from said client includes said content label;

selecting an application server group from a plurality of application servers in accordance with said content label associated with said session; and routing all requests received from said client to said selected application server group storing said selected application server group as a last accessed server group wherein each application server group being associated with a database;

determining replicaton latencies between said databases; and storing said replicaton latencies.

5. The method of claim 4, wherein the step of selecting includes the step of selecting an application server group as a function of said replication latencies.

6. The method of claim 4, wherein the step of selecting includes the steps of:

determining time elapsed between said last session time and a current session time if the database connected to said selected application server group is different from the database connected to said last accessed server group for said client to provide a session interval; and selecting said last accessed server group as said selected application server group if said replication latency between the databases connected to said last accessed server group and said selected application server group exceeds said session interval.

7. A system for dynamic content routing a client request to an application server comprising:

a web server for receiving a plurality of requests for dynamic content from a client associated with a session over a communications network, wherein at least one of said requests includes a content label;

a dynamic content router for determining whether a request received from said client includes said content label, associating said content label with said session and said client if it is determined that said request received from said client includes said content label, and selecting an application server group from a plurality of application servers connected to said network in accordance with said content label associated with said session;

wherein said web server is operable to route all requests from said client to said selected application server group; and wherein said router is operable to determine a session ID and a session time of said session, associate said content label associated with said session to said session ID to provide a link, and store said link, said session ID and said session time as a last session time.

8. The system of claim 7, wherein said router is operable to select an application server group based on session persistence.

9. The system of claim 7, wherein said router is operable to read said session ID from said request to determine said link if it is determined that said request received from said client does not include said content label and determine said content label as a function of said link.

10. A system for dynamic content routing a client request to an application server comprising:

a web server for receiving a plurality of requests for dynamic content from a client associated with a session over a communications network, wherein at least one of said requests includes a content label;

a dynamic content outer for determining whether a request received from said client includes said content label, associating said content label with said session and said client if it is determined that said request received from said client includes said content label, and selecting an application server group from a plurality of application servers connected to said network in accordance with said content label associated with said session; and wherein said web server is operable to route all requests from said client to said selected application server group;

wherein said route is operable to store said selected server group as a last accessed server group;

wherein each application server group being associated with a database; and wherein each database includes a replication agent for determining replication latencies between said databases and transmitting said replication latencies to said router; and wherein said router is operable to store said replication latencies.

11. The system of claim 10, wherein said router is operable to select an application server group as function of said replication latencies.

12. The system of claim 10, wherein said router is operable to determine time elapsed between said last session time and a current session time if the database connected to said selected server group is different from the database connected to said last accessed server group or said client to provide a session interval, and operable to select said last accessed server group as said selected server group if said replication latency between the databases connected to said last accessed server group and said selected server group exceeds said session interval.

13. A method of dynamic content routing a client request to an application server, comprising the step of:

- receiving a plurality of requests for dynamic content from a client associated with a session over a communications network, wherein at least one of said requests includes a content label;
- determining whether a request received from said client includes said content label;
- associating said content label with said session and said client if it is determined that said request received from said client includes said content label;
- selecting an application server group from a plurality of application servers in accordance with said content label associated with said session;
- routing all requests received from said client to said selected application server group
- determining whether another request received from said client includes a new content label;
- associating said new content label with said session and said client if it is determined that said other request received from said client includes said new content label; and
- selecting an application server group from said plurality of application servers in accordance with said content label associated with said session.

14. A system for dynamic content routing a client request to an application server comprising:

- a web server for receiving a plurality of requests for dynamic content from a client associated with a session over a communications network, wherein at least one of said requests includes a content label;
- a dynamic content router for determining whether a request received from said client includes said content label, associating said content label with said session and said client if it is determined that said request received from said client includes said content label, and selecting an application server group from a plurality of application servers connected to said network in accordance with said content label associated with said session;
- wherein said web server is operable to route all requests from said client to said selected application serve group; and
- wherein said router is operable to determine whether another request received from said client includes new content label, to associated said new content label with said session and said client if it is determined that said other request received from said client includes said new content label, and to select an application server group from said plurality of application servers in accordance with said content label associated with said session.

* * * * *